United States Patent
Mikado

(10) Patent No.: US 9,475,139 B2
(45) Date of Patent: Oct. 25, 2016

(54) TOOL HOLDER AND TOOL HOLDER ATTACHMENT STRUCTURE

(71) Applicant: NIKKEN KOSAKUSHO WORKS, LTD., Daito-shi (JP)

(72) Inventor: Susumu Mikado, Daito (JP)

(73) Assignee: NIKKEN KOSAKUSHO WORKS, LTD., Daito-shi (JP)

( * ) Notice: Subject to any disclaimer, the term of this patent is extended or adjusted under 35 U.S.C. 154(b) by 331 days.

(21) Appl. No.: 13/898,522

(22) Filed: May 21, 2013

(65) Prior Publication Data
US 2014/0044497 A1    Feb. 13, 2014

(30) Foreign Application Priority Data

Aug. 8, 2012  (JP) .................................. 2012-175947

(51) Int. Cl.
| | |
|---|---|
| B23C 5/26 | (2006.01) |
| B23Q 3/12 | (2006.01) |
| B23B 31/00 | (2006.01) |
| B23B 31/26 | (2006.01) |

(52) U.S. Cl.
CPC ............... *B23C 5/26* (2013.01); *B23B 31/006* (2013.01); *B23B 31/261* (2013.01); *B23Q 3/12* (2013.01); *B23B 2231/0292* (2013.01); *Y10T 409/30952* (2015.01); *Y10T 409/309408* (2015.01)

(58) Field of Classification Search
CPC ............... B23B 2231/0292; Y10T 409/30952
USPC .......................................................... 409/234
See application file for complete search history.

(56) References Cited

U.S. PATENT DOCUMENTS

| | | |
|---|---|---|
| 5,352,073 A | 10/1994 | Kitaguchi |
| 5,407,308 A | 4/1995 | Takayoshi |
| 5,964,556 A | 10/1999 | Toyomoto |
| 7,144,210 B2 | 12/2006 | Massa et al. |
| 7,690,874 B2 | 4/2010 | Erickson et al. |

FOREIGN PATENT DOCUMENTS

| | | |
|---|---|---|
| DE | 35 14 829 | 11/1986 |
| JP | 05-169303 A | 9/1993 |
| JP | 2571325 B2 | 11/1993 |
| JP | 07096436 A * | 4/1995 |
| JP | 07276168 A * | 10/1995 |
| JP | 2000158269 A * | 6/2000 |
| JP | 2001-310228 A | 11/2001 |
| JP | 2007-518585 A | 7/2007 |
| JP | 2011-506116 A | 3/2011 |

OTHER PUBLICATIONS

Complete English translation of JP 2000158269 A, Jun. 2000.*
European Examiner J. Prelovac, Extended European Search Report for European Patent Application EP 13 16 9095.0, dated Mar. 26, 2015, 8 pages, European Patent Office, Muenchen, Germany.

* cited by examiner

*Primary Examiner* — Sunil K Singh
*Assistant Examiner* — Alan Snyder
(74) *Attorney, Agent, or Firm* — W. F. Fasse

(57) ABSTRACT

A tool holder attachment structure includes a spindle and a tool holder. The spindle has a tip end face and a tapered hole. The tool holder has a tapered shank portion and a flange end face. In a clamped state, there is a clearance of a predetermined size between the flange end face of the tool holder and the tip end face of the spindle. As the spindle is rotated, the tapered hole of the spindle is slightly expanded by a centrifugal force caused by rotation of the spindle, and the presence of this clearance allows the tapered shank portion to be further drawn into the tapered hole so that the flange end face of the tool holder closely contacts the tip end face of the spindle, and the tapered shank portion is closely fitted in the tapered hole, whereby two-face restraint is implemented.

16 Claims, 2 Drawing Sheets

TOOL HOLDER AND TOOL HOLDER ATTACHMENT STRUCTURE

BACKGROUND OF THE INVENTION

1. Field of the Invention

The present invention relates to tool holder attachment structures that attach a tool holder provided with a cutting tool to a rotary spindle of a machine tool such as a machining center with an automatic tool changer, and tool holders that are attached to the rotary spindle.

2. Background Art

Such a tool holder attachment structure is disclosed in, e.g., Japanese Patent No. 2571325. FIG. 4 is a diagram corresponding to FIG. 5 of Japanese Patent No. 2571325, and shows a structure in which a tool holder is attached to a spindle of a machine tool.

In a tool holder 3 for use in a machining center with an automatic tool changer, a manipulator holding flange 5 for automatic tool changing is formed integrally with the tool holder 3 so as to adjoin a tapered shank portion 4. A tapered hole 2 is provided in a spindle 1 of a machine tool, and the tool holder 3 is drawn into the tapered hole 2 and is clamped therein by using a pull stud bolt.

The JIS or ISO standards specify the maximum diameter D, the axial length (reference dimension) L, etc. of the tapered hole 2 and the tapered shank portion 4, and specify that a predetermined opposing clearance Y should be provided between a reference end face 1a of the spindle 1 and an end face 5a of the flange 5 of the tool holder 3 in order to allow for a certain degree of manufacturing error $\Delta i$.

With this configuration, even if the reference end face 1a or the flange end face 5a protrudes slightly toward the opposing end face due to a manufacturing error, the reference end face 1a does not contact the flange end face 5a due to the predetermined opposing clearance Y, and the tapered shank portion 4 can be reliably closely fitted in the tapered hole 2.

However, this configuration has a disadvantage in that the close contact surfaces of the tapered hole 2 and the tapered shank portion 4 tend to be worn due to fretting corrosion etc. because the tapered shank portion 4 is intensively subjected to cutting load.

One way to overcome this disadvantage is to extend the reference end face 1a of the spindle 1 or the flange end face 5a so as to protrude by the opposing clearance Y so that the tapered shank portion 4 is closely fitted in the tapered hole 2 and the reference end face 1a closely contacts the flange end face 5a. However, the opposing clearance Y is provided so as to allow for the manufacturing error $\Delta i$. Therefore, if, e.g., the end face of the spindle 1 slightly protrudes by the amount of the manufacturing error, the end face of the spindle contacts the flange end face of the tool holder before the tapered shank portion 4 is closely fitted in the tapered hole 2, leaving a gap between the tapered hole 2 and the tapered shank portion 4. As a result, the tool holder cannot be reliably attached to the spindle.

The invention described in Japanese Patent No. 2571325 proposes the following configuration in order to solve the above problems. Each of the spindle end face and the flange end face facing the spindle end face is extended by an amount larger than the numerical value of the allowable manufacturing error $\Delta i$ specified in the industrial standards. Moreover, the spindle end face and the flange end face are extended toward each other so that the sum of the extension amounts $\alpha 1$, $\alpha 2$ of the spindle end face and the flange end face is within the range of the numerical value of the allowable opposing clearance Y. The tool holder 3 can be attached to the spindle 1 so that the extended end faces thus formed are fitted on each other.

SUMMARY OF INVENTION

However, the invention described in Japanese Patent No. 2571325 does not completely solve the conventional problems. Although not clearly described in Japanese Patent No. 2571325, there should be a clearance between the spindle end face and the flange end face when the tool holder is inserted into the tapered hole of the spindle of the machine tool. This is because when the tool holder is drawn into the tapered hole and clamped therein, the spindle is elastically deformed and the tool holder is drawn in the axial direction by about 0.01 mm to about 0.03 mm from the position in the inserted state.

It seems desirable that there be the clearance between the spindle end face and the flange end face when the tool holder is inserted in the tapered hole, and the spindle end face closely contact the flange end face and the tapered shank portion is closely fitted in the tapered hole when the tool holder is clamped. However, there are actually problems to be solved in this case as well. The inventor of the present application looked at the problem associated with the fact that the spindle is slightly expanded by the centrifugal force when the spindle is rotated. That is, even if a two-face restrained state is implemented in the clamped state, the tapered hole is slightly expanded due to the centrifugal force when the spindle is rotated, and a small gap appears between the tapered hole and the tapered shank portion. Therefore, when the spindle is rotated, the small gap appears between the tapered hole and the tapered shank portion, and only an end-face close contact state is achieved. In other words, only the flange end face of the tool holder (which is constantly drawn axially inward) and the spindle end face closely contact each other.

It is an object of the present invention to provide a tool holder attachment structure capable of implementing a two-face restrained state when a spindle is rotated.

A tool holder attachment structure according to the present invention includes a spindle of a machine tool and a tool holder. The spindle has a tip end face and a tapered hole extending axially inward from the tip end face. The tool holder has a tapered shank portion that fits in the tapered hole of the spindle, and a flange end face that faces the tip end face of the spindle. When attaching the tool holder, the tapered shank portion of the tool holder is drawn into the tapered hole of the spindle to clamp the tool holder to the spindle.

In the state where the tool holder is drawn into the tapered hole and clamped therein and the spindle is stopped, there is a clearance of a predetermined size between the flange end face of the tool holder and the tip end face of the spindle. If the spindle is rotated at a normal operation speed with the tool holder being kept in the clamped state, the tapered hole of the spindle is slightly expanded by a centrifugal force caused by the rotation of the spindle, and a small gap appears between the tapered hole and the tapered shank portion. In this case, the presence of the clearance of the predetermined size allows the tapered shank portion to be further drawn into the tapered hole so that the flange end face of the tool holder closely contacts the tip end face of the spindle, and the tapered shank portion is closely fitted in the tapered hole, whereby two-face restraint is implemented.

In a preferred embodiment, the amount of clearance between the flange end face of the tool holder and the tip end face of the spindle in the clamped state is selected within such a range that allows the tool holder to be unclamped from the two-face restrained state after a processing operation is finished. In the case where the amount of clearance is too large, the spindle generates heat by, e.g., cutting heat generated in a cutting operation and the tapered hole is greatly expanded. The tapered shank portion of the tool holder is thus excessively drawn in the axially inward direction, resulting in an excessively high bonding force between the tapered hole and the tapered shank portion. In this case, the tool holder cannot be unclamped in a changing operation of an automatic tool changer. If the amount of clearance is too small, only the end-face close contact state between the flange end face of the tool holder and the tip end face of the spindle is implemented. Specifically, if the amount if clearance is too small, the tapered shank portion is not closely fitted in the tapered hole, and only the flange end face of the tool holder and the tip end face of the spindle closely contact each other.

A preferred amount of the clearance between the flange end face of the tool holder and the tip end face of the spindle in the clamped state is selected in a range of 0.005 mm to 0.03 mm. A rotational speed of the spindle is, e.g., 500 min$^{-1}$ or higher.

A tool holder according to the present invention is a tool holder that is attached to a spindle of a machine tool, the spindle having a tip end face and a tapered hole extending axially inward from the tip end face, and the tapered hole being slightly expanded by a centrifugal force when the spindle is rotated. The tool holder includes: a tapered shank portion that fits in the tapered hole of the spindle; and a flange end face that faces the tip end face of the spindle. In a state where the tool holder is drawn into the tapered hole of the spindle and clamped therein, the flange end face is separated from the tip end face of the spindle by a clearance. In a state where the spindle is rotated, the flange end face closely contacts the tip end face of the spindle.

According to the tool holder having the above configuration, two-face restraint, namely close fit of the tapered shank portion and close contact of the flange end face, can be implemented when the spindle is rotated.

DESCRIPTION OF EMBODIMENTS

The present invention is intended to be applied particularly to a BT tool holder attachment structure that restrains a tapered shank portion of a tool holder in a tapered hole of a spindle.

Figure 1:
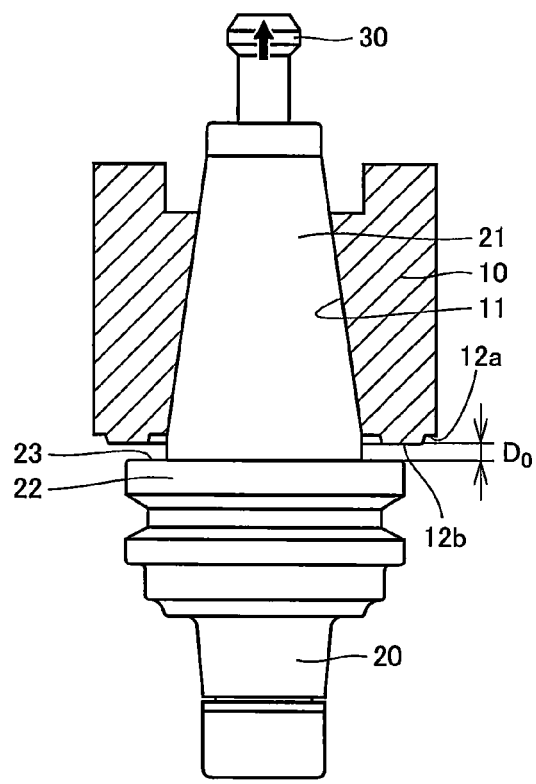
FIG. 1 is a cross-sectional view showing the state where a tool holder is attached to a tapered hole of a spindle.

FIG. 1 is a cross-sectional view showing the state where a tool holder is attached to a spindle of a machine tool. A spindle 10 has a tip end face 12a as a reference end face, and a tapered hole 11 extending axially inward from the tip end face 12a.

A tool holder 20 has a tapered shank portion 21 that is fitted in the tapered hole 11 of the spindle 10, and a flange portion 22 that is held by a manipulator for automatic tool changing. The flange portion 22 has a flange end face 23 facing the tip end face 12a of the spindle 10.

Figure 2:
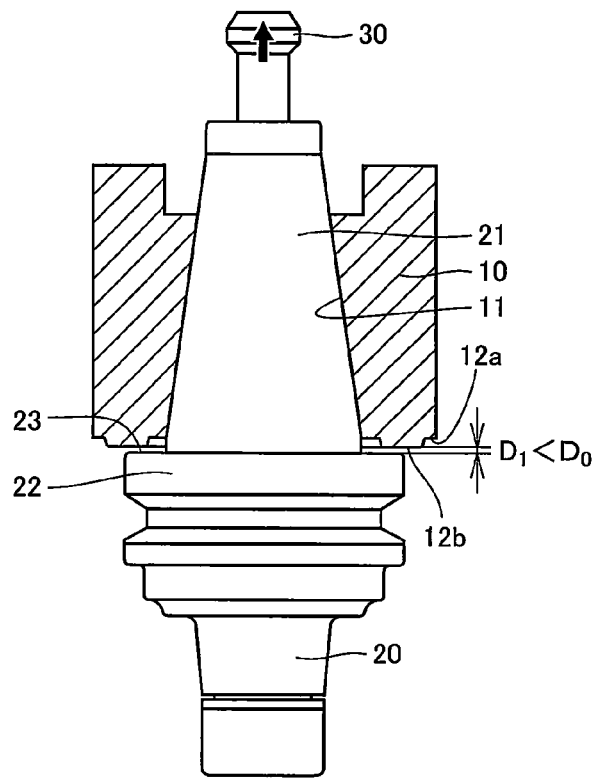
FIG. 2 is a cross-sectional view showing the state where the tool holder is drawn into the tapered hole of the spindle and clamped therein.

FIG. 1 shows the state where the tool holder 20 is attached to the spindle 10 by inserting the tapered shank portion 21 into the tapered hole 11. From the state shown in FIG. 1, the tapered shank portion 21 is further drawn into the tapered hole 11 and clamped therein by using a pull stud 30. FIG. 2 shows the clamped state. When the tapered shank portion 21 of the tool holder 20 is drawn into the tapered hole 11 of the spindle 10 to clamp the tool holder 20 to the spindle 10, the spindle 10 is elastically deformed, and therefore the tool holder 20 is drawn axially inward by about 0.01 mm to about 0.03 mm with respect to its position in the inserted state (the state shown in FIG. 1).

As described above, the JIS or ISO standards specify that a predetermined opposing clearance should be provided between the reference end face 12a of the spindle 10 and the flange end face 23 of the tool holder 20 in order to allow for a manufacturing error of the spindle or the tool holder. For example, the opposing clearance is 2 mm in BT30 and BT40, and 3 mm in BT50.

In order to implement an end-face close contact state between the reference end face 12a of the spindle 10 and the flange end face 23 of the tool holder 20 in addition to the close fit between the tapered portions when in use, the reference end face 12a of the spindle 10, for example, is extended toward the flange end face 23 to form a spindle extended end face 12b. The amount by which the spindle extended end face 12b is extended with respect to the reference end face 12a is determined by, e.g., "(standardized opposing clearance)/2−(amount by which the tool holder is drawn for clamping)." As described above, the "amount by which the tool holder is drawn for clamping" is about 0.01 mm to about 0.03 mm. The flange end face 23 of the tool holder 20 is also extended toward the reference end face of the spindle 10 to form a flange extended end face. The amount by which the flange extended end face is extended from the flange end face 23 is determined by, e.g., "(standardized opposing clearance)/2." Providing such extended end faces in view of the amount by which the tool holder is drawn for clamping allows an end-face close contact state to be implemented between the extended end face of the spindle 10 and the flange extended end face of the tool holder 20 when the tool holder is attached to the spindle and is drawn axially inward and clamped.

However, in the structure in which the end-face contact state is implemented when the tool holder 10 is drawn into the spindle and clamped thereto, the tapered portion is brought out of the close fit state by the centrifugal force caused when the spindle rotates at a normal operation speed. The inventor of the present application arrived at the following unique configuration in order to solve this problem.

In the state shown in FIG. 1, namely in the state where the tapered shank portion 21 of the tool holder 20 has been inserted and attached in the tapered hole 11 of the spindle 10 but has not been clamped, there is a clearance D0 between the extended end face 12b of the spindle 10 and the flange end face 23 of the tool holder 20. This clearance D0 is provided in view of the amount by which the tool holder 20 is drawn for clamping and the amount by which the tool holder 20 is drawn as the tapered hole is expanded during rotation of the spindle 10.

In the state shown in FIG. 2, namely in the state where the tapered shank portion 21 of the tool holder 20 has been drawn into the tapered hole 11 of the spindle 10 and clamped therein by using the pull stud 30, there is a clearance D1 between the extended end face 12b of the spindle 10 and the flange end face 23 of the tool holder 20. The clearance D1 is larger than zero, but is smaller than the clearance D0 shown in FIG. 1. This clearance D1 is provided in view of the amount by which the tool holder 20 is drawn as the tapered hole is expanded during rotation of the spindle 10.

It is an important feature of the present invention to provide the clearance D1 in the clamped state shown in FIG. 2. As the spindle 10 rotates at a normal operation speed according to operation of the machine tool, the tapered hole 11 of the spindle 10 is slightly expanded radially outward due to the centrifugal force. Accordingly, even if the clearance D1 is eliminated and both the close fit state between the tapered portions and the end-face contact state between the end face portions (two-face contact) are implemented in the clamped state shown in FIG. 2, the tapered portions are brought out of the close fit state when the spindle 10 rotates at the normal operation speed. Thus, only the end-face close contact state of the end face portions, namely one-face contact, is implemented when the spindle 10 rotates at the normal operation speed.

In the present invention, in the clamped state shown in FIG. 2, namely in the state where the tool holder 20 is drawn into the tapered hole 11 and clamped therein and the spindle 10 is stopped, there is the clearance D1 of the predetermined size between the flange end face 23 of the tool holder 20 and the extended end face 12b of the spindle 10. The size of the clearance D1 is selected so that both the close fit state between the tapered portions and the end-face close contact state between the end face portions (two-face restraint) can be implemented when the spindle 10 is rotated at a normal operation speed. Specifically, as the spindle is rotated at the normal operation speed, the tapered hole of the spindle is slightly expanded by the centrifugal force caused by the rotation of the spindle, whereby a small gap appears between the tapered hole and the tapered shank portion. Thus, the tapered shank portion being constantly subjected to the drawing force in the axially inward direction is further drawn into the tapered hole, so that the flange end face of the tool holder closely contacts the tip end face of the spindle, whereby both the close fit state between the tapered portions and the end-face close contact state between the end face portions (two-face restraint) can be implemented.

Figure 3:
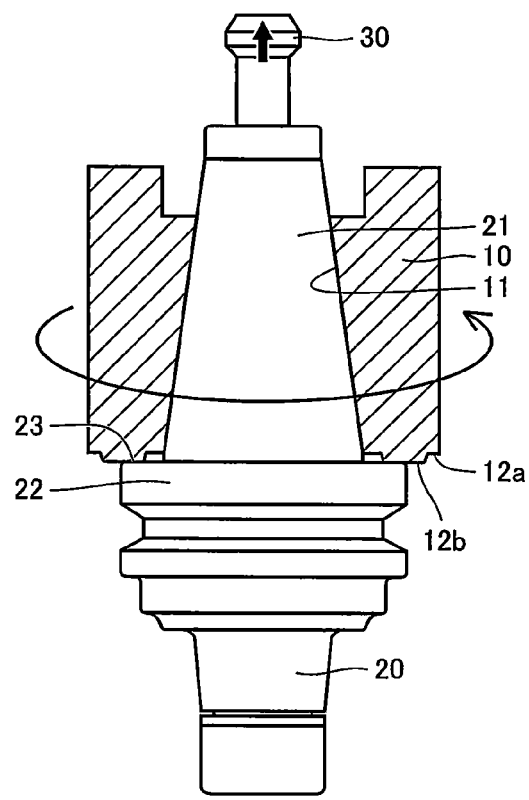
FIG. 3 is a cross-sectional view showing the state where the spindle is rotated at a normal speed.
Figure 4:
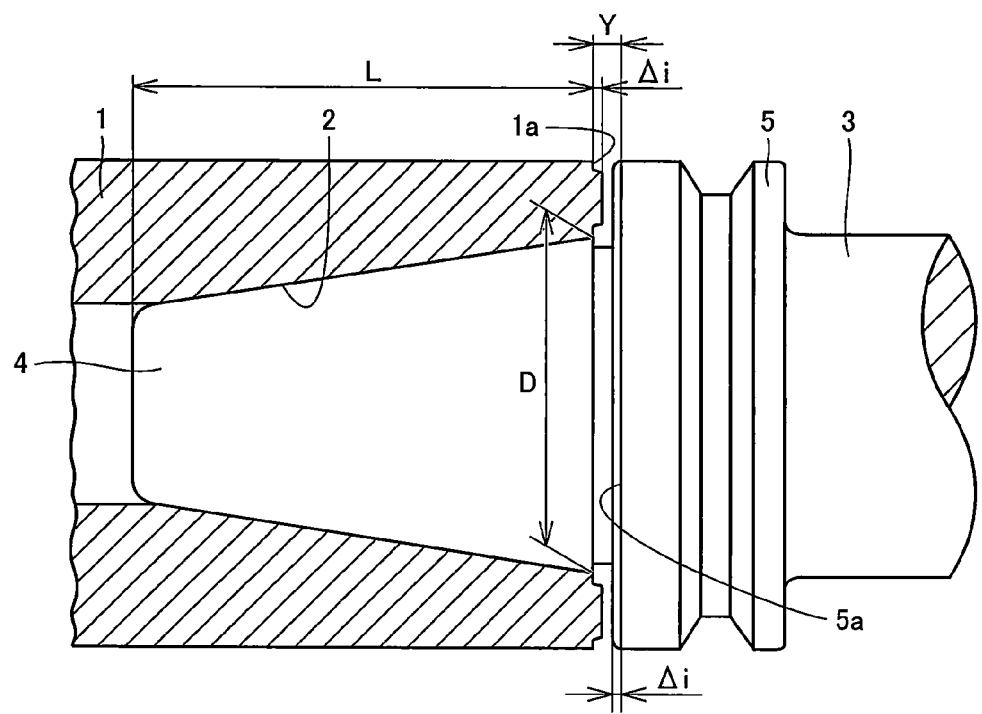
FIG. 4 is a diagram corresponding to Japanese Patent No. 2571325.

FIG. 3 shows the state where two-face restraint is implemented as the spindle 10 is rotated. In the state shown in FIG. 3, as the spindle 10 is rotated, the tapered hole 11 is slightly expanded by the centrifugal force. Since the clearance D1 is present, the tapered shank portion 21 being constantly subjected to the drawing force in the axially inward direction is further drawn into the tapered hole 11. Thus, in a normal operation, two-face restraint, namely not only the close fit state between the tapered hole 11 of the spindle 10 and the tapered shank portion 21 of the tool holder 20 but also the end-face close contact state between the extended end face 12b of the spindle 10 and the flange end face 23 of the tool holder 20 can be implemented.

In the case where the opposing clearance between the spindle end face and the flange end face is large as in the BT standards, the spindle generates heat by cutting heat generated in a cutting operation and the tapered hole of the spindle is greatly expanded. Thus, the tapered shank portion 21 is excessively drawn in the axially inward direction, resulting in an excessively high bonding force between the tapered hole 11 and the tapered shank portion 21. In this case, the tool holder 20 cannot be unclamped in a changing operation of an automatic tool changer.

In a preferred embodiment, the amount of clearance between the flange end face of the tool holder and the tip end face (extended end face) of the spindle in the clamped state is selected within such a range that allows the tool holder to be unclamped after a processing operation is finished. If the amount of clearance between the flange end face of the tool holder and the tip end face of the spindle in the clamped state is too small, only the end-face close contact state between the flange end face of the tool holder and the tip end face of the spindle is implemented as the spindle is rotated in the processing operation. Specifically, as the spindle is rotated in the processing operation, the tapered hole is expanded due to the centrifugal force. In this case, the tapered shank portion is not closely fitted in the tapered hole, and only the flange end face of the tool holder and the tip end face of the spindle closely contact each other. In view of the above, a preferred amount of clearance between the flange end face of the tool holder and the tip end face of the spindle in the clamped state is selected in the range of 0.005 mm to 0.03 mm. The rotational speed of the spindle is, e.g., 500 min$^{-1}$ or higher.

In order to implement two-face restraint during rotation of the spindle, the tool holder may have predetermined dimensions. That is, in view of the fact that the tapered hole is slightly expanded by the centrifugal force as the spindle is rotated at a normal operation speed, the tool holder may be designed so that the flange end face of the tool holder is separated from the tip end face of the spindle by a clearance in the state where the tool holder is drawn into the tapered hole and clamped therein, and so that the flange end face of the tool holder closely contacts the tip end face of the spindle in the state where the spindle is rotated.

The extended end face may be provided only in the reference end face of the spindle, may be provided only in the flange end face of the tool holder, or may be provided in both the reference end face of the spindle and the flange end face of the tool holder.

Although the embodiment of the present invention is described with reference to the drawings, the present invention is not limited to the illustrated embodiment. Various modifications and variations can be made to the illustrated embodiment without departing from the spirit and scope of the present invention.

The present invention can be advantageously used in tool holders and tool holder attachment structures which are capable of implementing two-face restraint during a processing operation.

The invention claimed is:

1. A tool holder attachment structure, comprising:
   a spindle of a machine tool, wherein said spindle has a tip end face and a tapered hole extending axially inward from said tip end face; and
   a tool holder having a tapered shank portion that fits in said tapered hole of said spindle, and a flange end face that faces said tip end face of said spindle, wherein said tool holder is configured in relation to said spindle so that:
   in a non-rotating clamped state in which said spindle is not rotating, said tapered shank portion is drawn axially into said tapered hole, thereby said tapered shank portion is radially clamped in said tapered hole and there is an axial clearance of a predetermined size between said flange end face of said tool holder and said tip end face of said spindle, and
   in a rotating state in which said spindle is rotated, said tapered hole of said spindle is slightly expanded by a centrifugal force caused by rotation of said spindle, and said tapered shank portion is drawn axially farther into said tapered hole until said axial clearance becomes closed and said flange end face of said tool holder comes into contact with said tip end face of said spindle during the rotation of said spindle in said rotating state, and said tapered shank portion becomes closely fitted and radially clamped in said tapered hole in said rotating state, whereby a two-surface restraint becomes implemented in said rotating state by said tapered shank portion contacting fittingly into said tapered hole and by said flange end face contacting said tip end face.

2. The tool holder attachment structure according to claim 1, wherein said predetermined size of said axial clearance between said flange end face of said tool holder and said tip end face of said spindle in said non-rotating clamped state is dimensioned within a range that allows said tool holder to be unclamped from said spindle after completion of a processing operation that uses said spindle and said tool holder in said rotating state.

3. The tool holder attachment structure according to claim 1, wherein said predetermined size of said axial clearance between said flange end face of said tool holder and said tip end face of said spindle in said non-rotating clamped state is in a range from 0.005 mm to 0.03 mm.

4. The tool holder attachment structure according to claim 1, wherein a rotational speed of said spindle is 500 min$^{-1}$ or higher in said rotating state.

5. A tool holder that is configured and adapted to be attached to a spindle of a machine tool, said spindle having a tip end face and a tapered hole extending axially inward from said tip end face, and said tapered hole being slightly expanded by a centrifugal force when said spindle is rotated in a rotating state,
said tool holder comprising:
a tapered shank portion that is configured and adapted to fit in said tapered hole of said spindle; and
a flange end face that is configured and adapted to face said tip end face of said spindle,
wherein said tool holder is configured and adapted to be attached to said spindle so that:
said tapered shank portion of said tool holder is configured and adapted to be drawn axially into said tapered hole of said spindle, whereby said tapered shank portion is radially clamped in said tapered hole and said flange end face is separated from said tip end face of said spindle by an axial clearance in a non-rotating clamped state in which said spindle is not rotating, and
said tapered shank portion is configured and adapted to move farther axially into said tapered hole until said tapered shank portion becomes radially clamped in said tapered hole and said flange end face comes into contact with said tip end face of said spindle in said rotating state in which said spindle is rotated and said tapered hole is thereby slightly expanded.

6. The tool holder according to claim 5, wherein an axial positional relationship between said flange end face and said tapered shank portion remains the same both in said non-rotating clamped state and in said rotating state.

7. The tool holder according to claim 5, wherein said tapered shank portion is fixedly arranged relative to said flange end face, so that said tapered shank portion and said flange end face move axially only together with one another.

8. The tool holder attachment structure according to claim 1, wherein an axial positional relationship between said flange end face and said tapered shank portion remains the same both in said non-rotating clamped state and in said rotating state.

9. The tool holder attachment structure according to claim 1, wherein said tapered shank portion is fixedly arranged relative to said flange end face, so that said tapered shank portion and said flange end face move axially only together with one another.

10. The tool holder according to claim 5,
wherein said tapered shank portion and said flange end face of said tool holder are particularly dimensioned and configured in relation to one another and in relation to the tapered hole and the tip end face of the spindle so that:
in said non-rotating clamped state, said tapered shank portion is radially clamped in said tapered hole, and said flange end face is separated from said tip end face by said axial clearance, and
in said rotating state, said tapered shank portion is radially clamped in said tapered hole, and said flange end face contacts said tip end face.

11. A tool holder that is configured and adapted to be attached to a spindle of a machine tool,
wherein the spindle has a tip end face and a tapered hole extending axially inward from the tip end face,
wherein the tapered hole has a first hole size in a non-rotating state in which the spindle is not rotating, and becomes slightly expanded to a second hole size larger than the first hole size by a centrifugal force in a rotating state in which the spindle is rotating, and
wherein said tool holder comprises:
tapered shank means for fitting tightly into the tapered hole of the spindle in both the non-rotating state and the rotating state, and
flange end face means for facing the tip end face of the spindle with an axial clearance therebetween when said tapered shank means are fitted tightly into the tapered hole in the non-rotating state and for contacting the tip end face of the spindle when said tapered shank means are fitted tightly into the tapered hole in the rotating state.

12. The tool holder according to claim 11, wherein said tapered shank means comprise a tapered shank, said flange end face means comprise a flange end face, and an axial positional relationship between said flange end face and said tapered shank remains the same in both the non-rotating state and the rotating state.

13. The tool holder according to claim 11, wherein said tapered shank means comprise a tapered shank, said flange end face means comprise a flange end face, and said flange end face is fixedly arranged relative to said tapered shank so that said flange end face and said tapered shank move axially only together with one another.

14. The tool holder according to claim 5, wherein said tapered shank portion has a continuous conical surface over an entire axial length of a part of said tapered shank portion that fits and is clamped in said tapered hole.

15. The tool holder according to claim 5, wherein said axial clearance between said flange end face of said tool holder and said tip end face of said spindle in said non-rotating clamped state is dimensioned within a range that allows said tool holder to be unclamped from said spindle after completion of a processing operation that uses said spindle and said tool holder in said rotating state.

16. The tool holder according to claim 5, wherein said axial clearance between said flange end face of said tool holder and said tip end face of said spindle in said non-rotating clamped state is in a range from 0.005 mm to 0.03 mm.

* * * * *